United States Patent
Barillaro et al.

(10) Patent No.: US 10,638,403 B2
(45) Date of Patent: Apr. 28, 2020

(54) METHOD AND SYSTEM FOR DYNAMIC CELL BARRING IN A MOBILE CELLULAR NETWORK

(71) Applicant: TELECOM ITALIA S.p.A., Milan (IT)

(72) Inventors: Giuseppe Barillaro, Turin (IT); Paolo Goria, Turin (IT); Giovanna Zarba, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/060,451

(22) PCT Filed: Dec. 30, 2015

(86) PCT No.: PCT/EP2015/081428
§ 371 (c)(1),
(2) Date: Jun. 8, 2018

(87) PCT Pub. No.: WO2017/114575
PCT Pub. Date: Jul. 6, 2017

(65) Prior Publication Data
US 2018/0368051 A1    Dec. 20, 2018

(51) Int. Cl.
*H04W 4/00* (2018.01)
*H04W 48/02* (2009.01)
(Continued)

(52) U.S. Cl.
CPC .......... *H04W 48/02* (2013.01); *H04W 24/08* (2013.01); *H04W 36/08* (2013.01); *H04W 84/042* (2013.01)

(58) Field of Classification Search
CPC ... H04W 48/025; H04W 24/08; H04W 36/08; H04W 84/042
(Continued)

(56) References Cited

U.S. PATENT DOCUMENTS 5,907,543 A * 5/1999 Jeon ...................... H04W 48/20
                                                    370/335
8,170,600 B2 * 5/2012 Song ................... H04W 52/346
                                                    455/522

(Continued)

FOREIGN PATENT DOCUMENTS

WO    WO 02/091781 A1    11/2002

OTHER PUBLICATIONS

International Search Report and Written Opinion dated Aug. 25, 2016 in PCT/EP2015/081428, filed on Dec. 30, 2015.

*Primary Examiner* — Thai D Hoang
(74) *Attorney, Agent, or Firm* — Oblon, McClelland, Maier & Neustadt, L.L.P.

(57) ABSTRACT

A method for operating a mobile cellular network. including: for at least one cell of a plurality of cells of the mobile cellular network: determining a radio interference affecting the cell in at least one between uplink and downlink transmissions; and if the radio interference affecting the cell is higher than a threshold radio interference, setting the cell in a first condition for preventing any user equipment using the mobile cellular network from camping on it for the at least one between uplink and downlink transmissions; or if the radio interference affecting the cell is lower than said threshold radio interference, setting the cell in a second condition for allowing any user equipment of the mobile cellular network to camp on it for the at least one between uplink and downlink transmissions.

15 Claims, 3 Drawing Sheets

Figure 1:
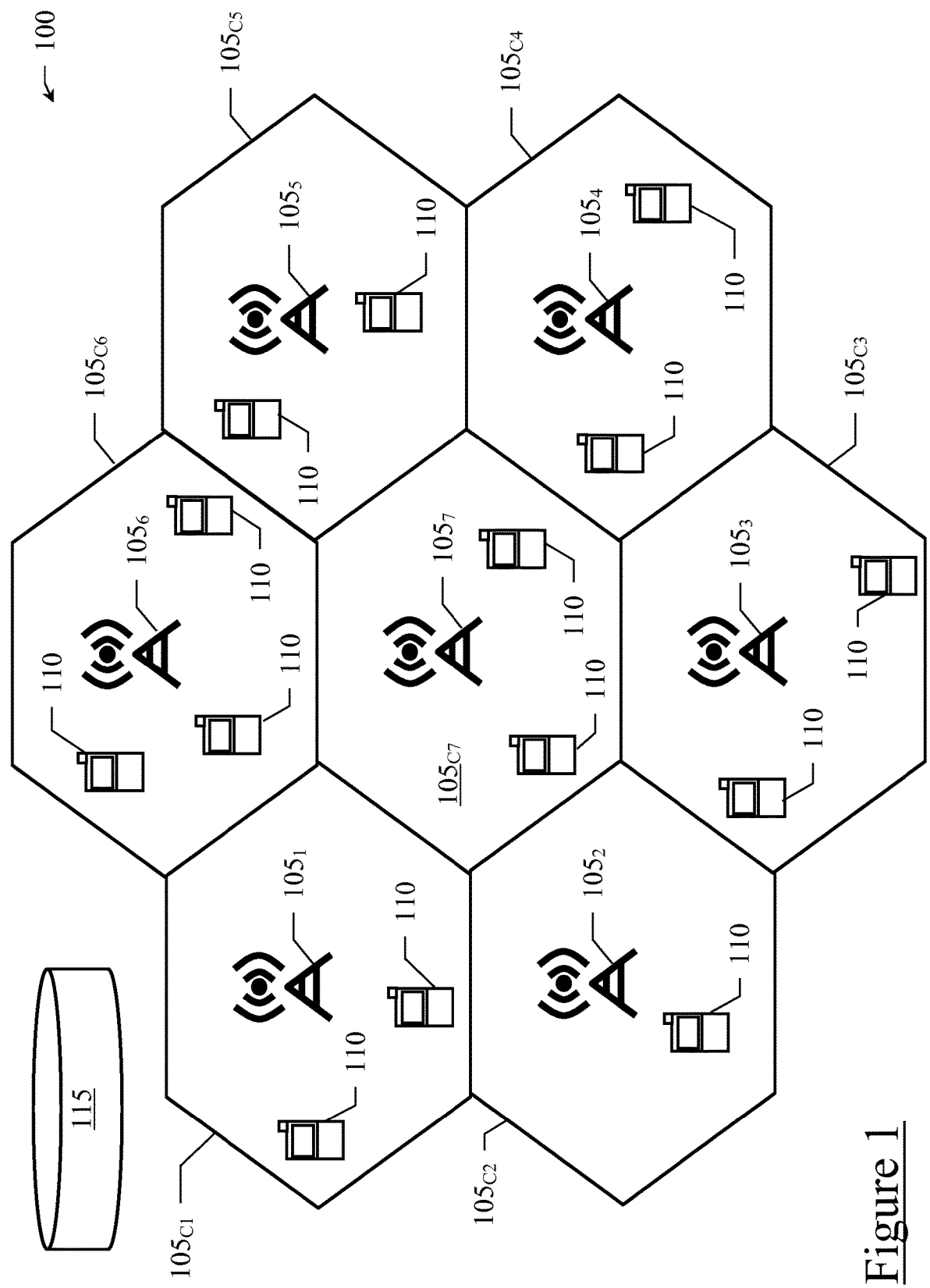

(51) Int. Cl.
*H04W 24/08* (2009.01)
*H04W 36/08* (2009.01)
*H04W 84/04* (2009.01)

(58) Field of Classification Search
USPC ............... 370/230–234, 252–253, 328–330, 370/341–345
See application file for complete search history.

(56) References Cited

U.S. PATENT DOCUMENTS

| | | |
|---|---|---|
| 10,057,917 B2 * | 8/2018 | Xu .................. H04W 72/12 |
| 2014/0148169 A1 | 5/2014 | Li et al. |
| 2014/0169240 A1 * | 6/2014 | Han .................. H04W 4/70 370/280 |
| 2014/0198673 A1 * | 7/2014 | Farinaccio ............ H04W 48/04 370/252 |
| 2017/0223604 A1 * | 8/2017 | Skillermark ............ H04W 4/80 |
| 2018/0213538 A1 * | 7/2018 | Na .................. H04B 17/11 |

* cited by examiner

METHOD AND SYSTEM FOR DYNAMIC CELL BARRING IN A MOBILE CELLULAR NETWORK

BACKGROUND OF THE INVENTION

Field of the Invention

The present invention relates to wireless or mobile radio networks, especially to mobile cellular networks. More particularly, the present invention relates to mobile cellular networks featuring an automation technology designed for performing planning, configuration, management, optimization and healing of mobile radio networks at least partially in an automatic manner, generally referred to as "Self-Organizing Networks" (SON). Even more particularly, the present invention relates to a method and system for dynamically managing cell barring (or other procedures of making network cells unavailable to user equipment camping) within such mobile cellular networks.

Overview of the Related Art

Mobile cellular networks, for example "Long Term Evolution" (LTE) and "LTE-Advanced" (LTE-A) cellular networks, are moving towards an increasing complexity in order to provide users with an increasing number of services and an exchange of data at increasing data rates.

In order to simplify the management complexity of such cellular networks, "Self-Organizing Networks" (hereinafter, SON networks) have been proposed in the art.

SON networks are radio mobile networks adapted to configure and optimize the operation of hardware elements (e.g., radio base stations, relay nodes etc.) and of the whole operation of the radio mobile network automatically. A SON network typically comprises self-configuration, self-optimization and self-healing functionalities.

According to the self-configuration functionality, newly deployed radio base stations or network nodes (e.g., evolved node B—eNBs—in LTE and LTE-A cellular networks), as well as respective network cells defined by them, are configured by automatic installation procedures through which necessary basic configuration for operation in the radio mobile network are set in each radio base station.

According to the self-optimization functionality, data obtained from measurements of performance indicators (typically denoted as "Key Performance Indicators"—KPIs—in SON networks) of user equipment (e.g., mobile terminals connected to the radio mobile network) and the network nodes are used to automatically adjust the operation of the radio mobile network in order to achieve a given target (e.g., efficiency, performance, etc.). Preferably, performance indicators provide an indication of a communication channel state (i.e., they provide information about the communication between the user equipment and the network nodes). Examples of performance indicators are received power on a radio channel, user data throughput at MAC layer, received quality of a radio channel, etc.

According to the self-healing functionality, failures in the radio mobile network are automatically detected and localized, and auto-correction (i.e., self-healing) mechanisms are applied for solving such failures.

In mobile cellular networks, radio interferences are crucial issues.

Radio interferences may comprise internal radio interference, i.e. the radio interference that is originated by devices operating within the mobile cellular network itself, and/or external radio interference, i.e. the radio interference that is originated outside the mobile cellular network.

The network cells affected by a high level of radio interference are substantially unable to carry most of data traffic, thereby degrading the performance of the user equipment in terms of (uplink and/or downlink) throughput and hence making the experience of users served by such network cells poor.

A highly unfavorable condition arises when external radio interference mainly affects uplink transmission. Indeed, in this case user equipment are still able to camp on the affected network cells, but they are not able to transmit over them.

A number of known solutions exist that are based on a common approach of preventing user equipment from camping on affected network cells when a predetermined radio interference condition arises, so that these network cells become unavailable for transmission.

US2010/0273500, "Pilot channel transmission in a cellular communication network", discloses a cellular communication network wherein the power of the pilot channel transmitted by the base station is decreased when the uplink interference in its cell area increases above a threshold value. As a result the mobile terminals at the edge of the cell area are triggered to reselect another base station and the number of call drops and failed call set-ups is reduced.

US2013/0051366, "Method and apparatus for cell barring in a wireless communication system" discloses systems and methodologies that facilitate cell barring based on erroneous messages received within a wireless communication system. In the event that a device fails to receive and/or decode respective messages transmitted from a network cell over a common communication channel, the device can implement one or more error handling procedures to reselect away from the network cell and/or a frequency associated with the network cell (e.g., as if the network cell was explicitly barred). Cell barring can be triggered based on a count of erroneous messages (e.g., consecutive messages, messages received within a predetermined time window, etc.), elapsed time between erroneous messages, or the like. Further, cell barring can be performed based on failure to acquire pre-scheduled system information, common system information determined to have invalid abstract syntax, or the like.

US2010/0113026, "Efficient reselections in the presence of closed subscriber group cells", discloses a method in a mobile station for avoiding interference to restricted access cells, including: detecting presence of a restricted access cell, determining that a measured path-loss is larger than a path-loss threshold, determining that the mobile station is not allowed to access the restricted access cell, and barring a carrier frequency on which the restricted access cell is deployed when the measured path-loss is larger than the path-loss threshold and when the mobile station is not allowed access to the restricted access cell.

SUMMARY OF INVENTION

The Applicant has recognized that none of the cited prior-arts solutions is satisfactory.

Indeed, those solutions based on preventing user equipment from camping on affected network cells when a predetermined radio interference condition arises, do not take into account that radio interference is not constant over time and space. Thus, by simply avoiding a network cell to be indefinitely suitable for camping due to radio interference is not a viable approach, since a relatively high number of time windows could exist wherein an affected network cell could still serve data traffic due to a decreased or ceased radio interference.

In addition, the Applicant believes that none of the cited prior-art solutions is able to overcome the above-mentioned issues.

Indeed, US2013/0051366 only discloses error handling procedures that are run in response to failures to receive and/or decode messages between network cells and user equipment over common communication channels, whereas US2010/0113026 only discloses barring a carrier frequency on which a restricted access cell is deployed.

As far as US2010/0273500 is concerned, this prior-art document discloses thwarting camping on affected network cells by reducing power of the pilot channels (e.g., reference signals for LTE). However, the Applicant has understood that a reduction of power of the pilot channels corresponds to a reduction of network cell size (i.e., lower coverage area of the respective network node). This implies that only user equipment that are at network cell edge, and hence that receive a lower power level from the pilot channels, are not allowed to camp on affected network cells, whereas the other user equipment can still be camped on the affected network cells (thus being still subject to potential bad performance).

In view of the above, the Applicant has faced the above mentioned issues, and has devised a solution for automatically and dynamically avoiding a network cell to be suitable for camping in presence of radio interference affecting it and for restoring again the network cell once in absence of the radio interference (or at least when the radio interference has decreased).

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for operating a mobile cellular network. The method comprises, for at least one cell of a plurality of cells of the mobile cellular network:

determining a radio interference affecting the cell in at least one between uplink and downlink transmissions, and if the radio interference affecting the cell is higher than a threshold radio interference, setting the cell in a first condition for preventing any user equipment using the mobile cellular network from camping on it (i.e., on the cell) for said at least one between uplink and downlink transmissions, or if the radio interference affecting the cell is lower than said threshold radio interference, setting the cell in a second condition for allowing any user equipment using the mobile cellular network to camp on it (i.e., on the cell) for said at least one between uplink and downlink transmissions.

According to an embodiment of the present invention, said method is carried out periodically (e.g., upon reception of updated performance measurements associated with the radio interference affecting the cell and/or according to a frequency with which the availability of each cell is intended to be updated), such that a cell can be restored in the first condition from the second condition substantially as soon as the radio interference affecting the cell is again higher than said threshold radio interference.

According to an embodiment of the present invention, said setting the cell in a second condition comprises setting the cell in the second condition if the radio interference affecting the cell is lower than a further threshold radio interference level, the further threshold radio interference level being lower than said threshold radio interference.

According to an embodiment of the present invention, the method comprises comprising, if the radio interference affecting the cell is between said threshold radio interference and said further threshold radio interference, leaving the cell in the current first or second condition.

According to an embodiment of the present invention, said determining a radio interference affecting the cell and said setting the cell in a first or second condition are carried out further if the cell has been in the second or first condition, respectively, for a time interval, said time interval being preferably longer than a threshold time interval.

According to an embodiment of the present invention, said determining a radio interference affecting the cell is based on at least one among:
 throughput of user equipment currently camped on the cell, and
 "Received Total Wideband Power".

According to an embodiment of the present invention, said determining a radio interference affecting the cell is based on at least one among:
 average throughput of user equipment currently camped on the cell, preferably averaged on a first predetermined monitoring time interval, and
 average "Received Total Wideband Power", preferably averaged on a second predetermined monitoring time interval.

According to an embodiment of the present invention, the method further comprises determining a current data traffic load of the cell. Said setting the cell in a second condition is preferably carried out further if the current data traffic load of the cell is lower than a threshold data traffic load, said threshold data traffic load being preferably indicative of a maximum data traffic load that can be sustained by that cell.

According to an embodiment of the present invention, said determining a current data traffic load of the cell is based on at least one among:
 transmission power of the cell, and
 percentage of occupied "Orthogonal Variable Spreading Factor" codes.

According to an embodiment of the present invention, said setting the cell in a first condition comprises setting the cell in a barred condition, and said setting the cell in a second condition comprises setting the cell in an unbarred condition.

According to an embodiment of the present invention, said setting the cell in a first condition comprises setting at least one cell selection parameter and/or at least one cell reselection parameter of the cell at such a value that, respectively, a cell selection criterion and/or a cell reselection criterion is not fulfilled thereby preventing the user equipment from camping on that cell.

According to an embodiment of the present invention, the user equipment is allowed to camp only on cells associated with one or more first "Public Land Mobile Networks". Said setting the cell in a first condition preferably comprises signaling that the cell is associated with a second "Public Land Mobile Network". Said second "Public Land Mobile Network" is preferably different from any of said one or more first "Public Land Mobile Networks".

According to an embodiment of the present invention, the cell is compliant with the "Application specific Congestion control for Data Communication" functionality. Said setting the cell in a first condition preferably comprises signaling to at least one user equipment that an access to the cell is barred for at least one "Access Class".

According to an embodiment of the present invention, the user equipment is allowed to camp only on cells associated with one or more allowed values of a "Priority" parameter. Said setting the cell in a first condition preferably comprises signaling to the user equipment that the cell is associated with a "Priority" parameter whose value is lower than any of said allowed values.

Another aspect of the present invention relates to a computer program product directly loadable into a memory of a computer, the computer program product comprising software code means adapted to perform any of the above method steps when run on the computer.

A further aspect of the present invention Relates to a system for operating a mobile cellular network. The system comprises:

a determiner module for determining a radio interference affecting at least one cell of a plurality of cells of the mobile cellular network (100) in at least one between uplink and downlink transmissions, a comparator module for comparing the determined radio interference a with a threshold radio interference, and an instructor module for causing the at least one cell to be set in a first condition preventing any user equipment using the mobile cellular network from camping on it (i.e., on the cell) for said at least one between uplink and downlink transmissions, if the radio interference affecting the cell is higher than said threshold radio interference, or a second condition allowing any user equipment using the mobile cellular network to camp on it (i.e., on the cell) for said at least one between uplink and downlink transmissions, if the radio interference affecting the cell is lower than said threshold radio interference.

The present invention allows automatically deciding to set a network cell (or cell) affected by a radio interference (for example, but not limited to, an uplink radio interference) to a non-availability condition (for example, but not limited to, a barred condition) and to restore the network cell as soon as no, or substantially no, radio interference affects it. As a result, when a network cell affected by radio interference is set in the non-availability condition, each user equipment in the affected network cell is triggered to camp on another (non-affected) network cell in order to connect to the mobile cellular network.

BRIEF DESCRIPTION OF THE ANNEXED DRAWINGS

Figure 2:
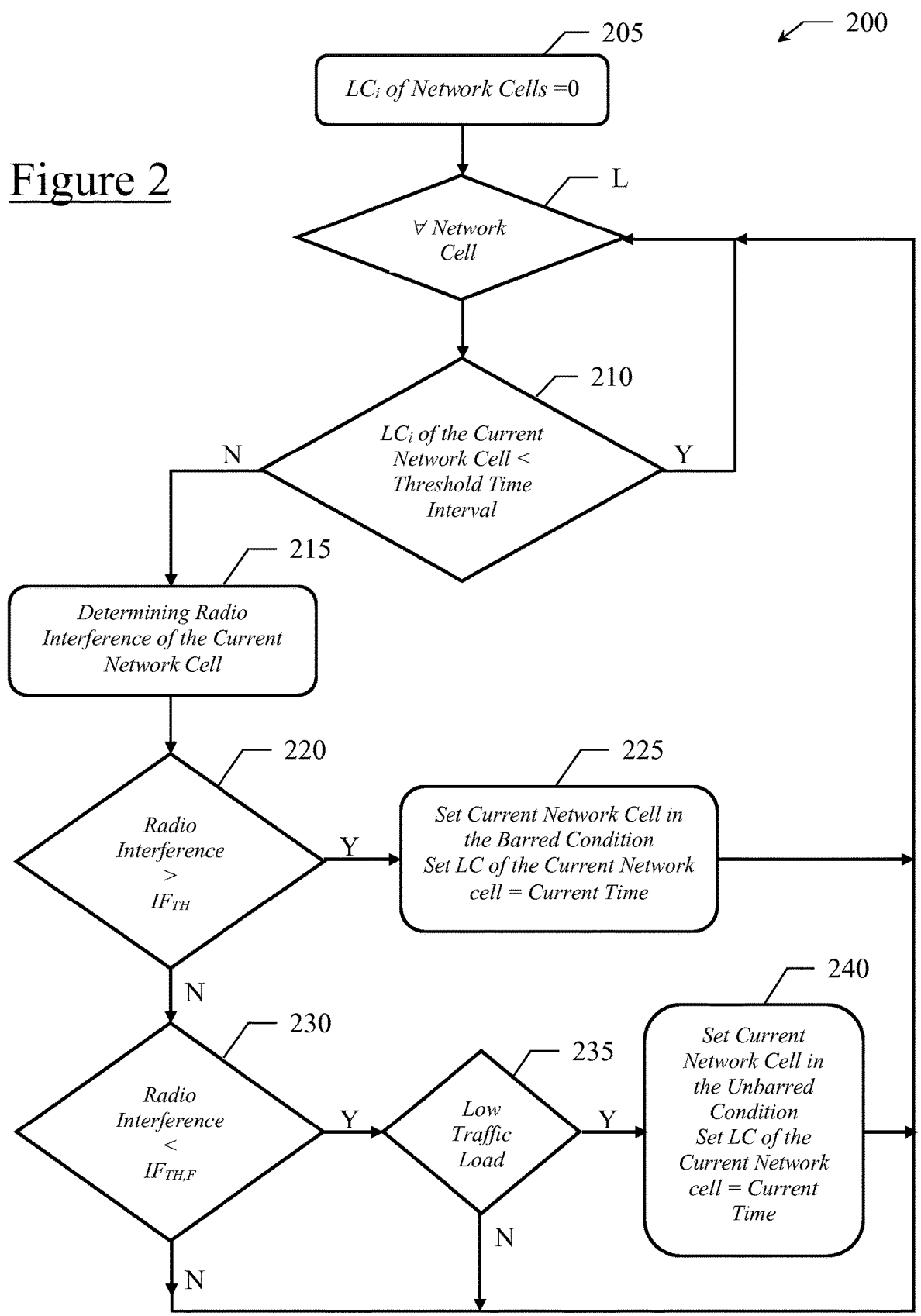
Figure 3:
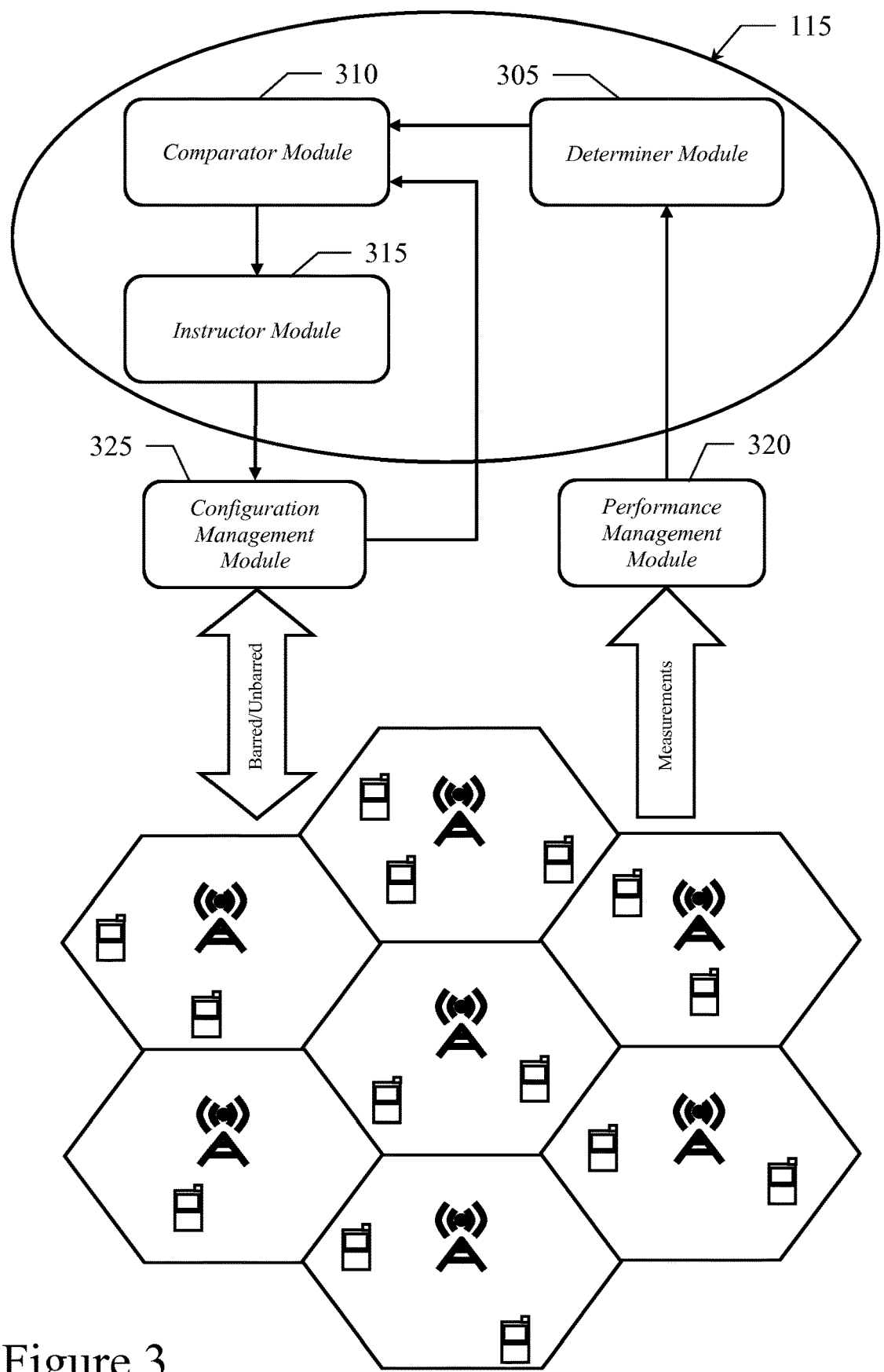

These and other features and advantages of the present invention will be made apparent by the following description of some exemplary and non-limitative embodiments thereof; for its better intelligibility, the following description should be read making reference to the attached drawings, wherein:

FIG. 1 schematically shows a portion of a radio mobile network wherein the present invention can be applied;

FIG. 2 shows a simplified activity diagram of a method for dynamically managing cell availability to be camped on by user equipment, according to an embodiment of the present invention, and FIG. 3 shows, in terms of operative modules, a simplified architecture of a central system implementing the method according to an embodiment of the present invention.

DETAILED DESCRIPTION OF PREFERRED EMBODIMENTS OF THE INVENTION

With reference to the drawings, a portion of a radio mobile network, (e.g., a mobile cellular network) 100 according to an embodiment of the present invention is schematically shown in FIG. 1. The mobile cellular network 100 (e.g., compliant with the "Universal Mobile Telecommunications System" (UMTS) or 3GPP LTE/LTE-Advanced standard) comprises a number N of transceiver stations (hereinafter, network nodes) $105_i$ (i=1, 2, 3, 4, . . . N, with N=7 in the example at issue).

Each network node $105_i$ is configured to provide radio coverage over a respective geographic area, also referred to as network cell or cell $105_{ci}$ (for example, hexagonal in shape), for allowing one or more user equipment 110 within the network cells $105_{ci}$ (e.g., a cellular phone, a personal digital assistant (PDA), a wireless modem, a wireless communication device, a handheld device, a laptop computer, or a cordless phone) to exchange data traffic relating to communication services (e.g., web browsing, e-mailing, voice, or multimedia data traffic). In the simplified illustrated mobile cellular network 100, each network cell $105_{ci}$ is defined by a single, respective network node $105_i$, however, the present invention equivalently applies to mobile cellular networks 100 wherein, as in practical implementations, a single or a plurality of network cells $105_{ci}$ are identified by a single or a plurality of network nodes (e.g., macro network nodes and/or small network nodes, the latter including for example pico and/or femto network nodes).

A user equipment 110 may perform, e.g. upon power up or loss of radio coverage, a cell selection procedure aimed at finding a suitable network cell from which the user equipment 110 can receive full communication services (as opposed to limited communication services, such as emergency calls). A network cell $105_{ci}$ may be deemed as suitable if one or more cell selection criteria (typically based on one or more cell selection parameters) are fulfilled. If a suitable network cell is found, the user equipment 110 may then camp on it (in which case the network cell $105_{ci}$ on which the user equipment 110 is camped is referred to as the serving network cell).

While camped on the serving network cell, the user equipment 110 may periodically perform a cell reselection procedure aimed at finding a better network cell $105_{ci}$ the user equipment 110 can camp on. If such a network cell $105_{ci}$ exists, i.e. if one or more cell reselection criteria (typically based on one or more cell reselection parameters) are fulfilled, then the user equipment 110 may select this network cell $105_{ci}$ as its new serving cell.

For the sake of completeness, as well known by those having ordinary skill in the art, the network nodes $105_i$ form the radio access network. In turn, the radio access network is generally communicably coupled with one or more core networks (not shown), which may be coupled with other networks, such as the Internet and/or public switched telephone networks (not illustrated).

According to the present invention, a method or algorithm is proposed for effectively and dynamically managing the availability of each network cell $105_{ci}$ (or of a proper subset thereof) to be camped on by one or more user equipment 110. The method is suitable for being implemented by proper code means included in a computer program, when the program is run on a computer, thus the functionality provided by the proposed method (and referred to as cell availability functionality in the following) can be easily added to, or integrated in, the operation of either future or existing mobile cellular networks.

According to an embodiment of the present invention, as herein assumed by way of example only, a "Centralized Self-Organizing Network" (or C-SON network) architecture is considered for the mobile cellular network 100, and the method is run at a central system 115 (e.g., at corresponding operative modules thereof) connected to one or more network nodes $105_{ci}$ through a proper interface (e.g., a northbound interface), thus providing a centralized cell availability functionality. Anyway, as should be readily understood, the present invention also applies when a "Distributed Self-Organizing Network" (or D-SON network) architecture is considered for the mobile cellular network 100—in which case the method is preferably run at each network node $105_{ci}$ (or at one or more subsets or groups of the network nodes $105_{ci}$) thereby providing a distributed cell availability functionality.

With reference now to FIG. 2, it shows a simplified activity diagram of a method 200 providing a cell availability functionality, according to an embodiment of the present invention. For the sake of description ease, such a figure will be discussed jointly with FIG. 3, the latter schematically showing, in terms of operative modules, a simplified architecture of the central system 115 according to an embodiment of the present invention.

It is pointed out that the use of the term "module" is herein intended to emphasize functional (rather than implementation) aspects thereof. Indeed, without losing of generality, each module may be implemented by software (in which case, the resulting algorithm would be performed by proper code means included in a computer program, when the program is run on a computer), hardware, and/or a combination thereof. Moreover, the modules may also reflect, at least conceptually, the physical structure of the central system 115. However, the modules may have, by the physical viewpoint, distributed nature, it being understood that, by the logical viewpoint, they are all part of the central system 115, wherever (and in whichever way) their physical implementation actually takes place.

Broadly speaking, the method 200 comprises, periodically (i.e. at each operating time period, corresponding, for example, to a frequency with which the availability of each network cell $105_{ci}$ is intended to be updated, and/or to the reception of updated performance measurements), and for at least one (for example, for each) network cell $105_{ci}$, determining a radio interference affecting the network cell $105_{ci}$ (action step 215) in uplink and/or downlink transmissions, and if the radio interference affecting the network cell $105_{ci}$ in uplink and/or downlink transmissions is higher than a threshold radio interference $I_{TH}$ (exit branch Y of the decision step 220), setting the network cell $105_{ci}$ in a first condition for preventing any (or, according to specific embodiments, at least a relevant part of) user equipment 110 of the mobile cellular network 100 from camping on that network cell $105_{ci}$ for, respectively, uplink and/or downlink transmissions (action step 225), or if the radio interference affecting the network cell $105_{ci}$ in uplink and/or downlink transmissions is lower than the threshold radio interference $I_{TH}$ (exit branch N of the decision step 220 and exit branch Y of the decision step 230), setting the network cell $105_{ci}$ in a second condition for allowing any (or, according to specific embodiments, at least a relevant part of) user equipment 110 of the mobile cellular network 100 to camp on that network cell $105_{ci}$ for, respectively, uplink and/or downlink transmissions (action step 240).

Preferably, said determining the radio interference affecting the network cell $105_{ci}$ is performed at a determiner module 305 of the central system 115, whereas comparator 310 and instructor 315 modules of the central system 115 are arranged, respectively, for comparing the determined radio interference of the network cell $105_{ci}$ to the threshold radio interference $I_{TH}$ (and, preferably, to a further threshold radio interference, as detailed below) and for setting the network cell $105_{ci}$ (or, as herein assumed, for causing the network cell $105_{ci}$ to be set) at the first or second condition accordingly.

According to an embodiment of the present invention, as herein exemplary assumed, the first or second condition at which each network cell $105_{ci}$ is set according to the radio interference affecting it is, respectively, a barred or unbarred condition (in the following, cell barring or cell unbarring will denote the procedures provided by the 3GPP standard specifications for setting the barred or unbarred condition). According to 3GPP standard specifications (see 3GPP TS 25.304) a barred network cell is a network cell where a user equipment is not allowed to camp on. A network cell is barred if it is so indicated in system information periodically sent by the respective network node (see TS25.331, section 10.3.2.1). According to said 3GPP standard specifications, when a network cell is barred, the user equipment:

is not allowed to consider that network cell for selection or reselection procedure (not even for emergency calls), is not allowed to receive any "Multimedia Broadcast Multicast Services" (MBMS) services from that network cell, and shall select another network cell.

Anyway, without loss of generality, additional or alternative embodiments may be foreseen for making a network cell $105_{ci}$ available or unavailable for a user equipment 110 to camp on.

For example, according to a first embodiment of the present invention, a network cell $105_{ci}$ may be made unavailable for camping (i.e., setting of the network cell $105_{ci}$ in the first condition) by setting one or more among the cell selection parameters and/or one or more among the cell reselection parameters at such value(s) that, respectively, the cell selection criteria and/or the cell reselection criteria are not fulfilled. In other words, by designedly changing (the value of) one or more among the cell selection parameters and/or (the value of) one or more among the cell reselection parameters for a network cell $105_{ci}$, the user equipment 110 is prevented from camping on that network cell $105_{ci}$ by non-fulfillment of the selection criteria (during the selection procedure) and/or of the reselection criteria (during the reselection procedure)—conversely, when the network cell $105_{ci}$ has to be made available for camping, the original values of the cell selection and/or reselection parameters are restored.

By way of example only, in case of UMTS mobile cellular network, the cell selection and reselection parameters may include one or more among the following parameters defined by the 3GPP standard:

"Qrxlevmin", "Qqualmin" (see 3GPP TS 25.331, section 10.3.2.3: "Cell selection and re-selection info for SIB3/4"). By way of a quantitative example only, the "Qrxlevmin" and "Qqualmin" parameters of an affected network cell $105_{ci}$ (i.e., of a network cell $105_{ci}$ affected by radio interference) can be set respectively to −25 dBm and 0 dB (i.e., the maximum values admitted in 3GPP TS 25.331 for these parameters) in order to make affected cell $105_{ci}$ unavailable for camping;

"Qoffset1s,n", "Qoffset2s,n" (see 3GPP TS 25.331, section 10.3.2.4: "Cell selection and re-selection info for SIB11/12"). By way of a quantitative example only, the "Qoffset1s,n" and "Qoffset2s,n" parameters of an affected network cell $105_{ci}$ can be set to 50 dB (i.e., the maximum value admitted in 3GPP TS 25.331 for these parameters) in the whole mobile cellular network 100 in order to make affected cell $105_{ci}$ unavailable for camping;

"Cell individual offset" (see 3GPP TS 25.331, section 10.3.7: "Measurement information elements"). By way of a quantitative example only, the "Cell individual offset" parameter of an affected network cell $105_{ci}$ can be set to −10 dB in the whole mobile cellular network 100 (i.e., the minimum value admitted in 3GPP TS 25.331 for this parameter) in order to make affected cell $105_{ci}$ unavailable for camping;

in case of LTE and LTE-Advanced mobile cellular network, the cell selection and reselection parameters may include one or more among the following parameters defined by the 3GPP standard:

"Q-RxLevMin" or "Q-QualMin" (see 3GPP TS 36.331, section 6.3.4: "Mobility control information elements"). By way of a quantitative example only, the "Q-RxLevMin" and "Q-QualMin" parameters of an affected network cell $105_{ci}$ can be set respectively to −44 dBm and −3 dB (i.e., the maximum values admitted in 3GPP TS 36.331 for these parameters) in order to make affected cell $105_{ci}$ unavailable for camping;

"q-OffsetCell" (see 3GPP TS 36.331, section 6.3.1: "System information blocks"). By way of a quantitative example only, the "q-OffsetCell" parameter of an affected network cell $105_{ci}$ can be set to 24 dB in the whole mobile cellular network 100 (i.e., the maximum value admitted in 3GPP TS 36.331 for this parameter) in order to make affected cell $105_{ci}$ unavailable for camping;

"Cell individual offset" (see 3GPP TS 36.331, section 6.3.5: "Measurement information elements") By way of a quantitative example only, the "Cell individual offset" parameter of an affected network cell $105_{ci}$ can be set to −24 dB in the whole mobile cellular network 100 (i.e., the minimum value admitted in 3GPP TS 36.331 for this parameter) in order to make affected cell $105_{ci}$ unavailable for camping.

According to a second embodiment of the present invention, in order to make a network cell $105_{ci}$ unavailable for camping, the respective network node $105_i$, (i.e. the network node $105_i$ associated with or pertaining to that network cell $105_{ci}$ is caused to signal to each user equipment 110 (or group of user equipment) that the network cell $105_{ci}$ is associated with one or more "Public Land Mobile Networks" different from any of the (one or more) possible "Public Land Mobile Networks" supported by that user equipment 110 (or group of user equipment). In other words, by declaring purposely that a network cell $105_{ci}$ is associated with "Public Land Mobile Networks" different from any of the (one or more) possible "Public Land Mobile Networks" supported by that user equipment 110, and independently from the "Public Land Mobile Networks" to which the network cell $105_{ci}$ is actually associated, the user equipment 110 is prevented from considering that network cell $105_{ci}$ as a (valid) potential serving cell.

According to a third embodiment of the present invention, to be advantageously applied when the network node $105_i$ is exploiting "Application specific Congestion control for Data Communication" (ACDC) functionality as defined in 3GPP TS 24.301, in order to make an associated network cell $105_{ci}$ unavailable for camping, the network node $105_i$ is caused to signal to each user equipment 110 (or group of user equipment) that the access to the network cell $105_{ci}$ is barred for one or more "Access Class", thus preventing involved user equipment 110 that are going to operate based on such "Access Class" from considering that network cell $105_{ci}$ as a (valid) potential serving cell.

According to a fourth embodiment of the present invention, to be advantageously applied when the network node $105_i$ is exploiting "MultiCarrier Load Distribution" functionality under definition within 3GPP, in order to make an associated network cell $105_{ci}$ unavailable for camping, the network node $105_i$ is caused to signal to each user equipment 110 (or group of user equipment) that the network cell $105_{ci}$ is associated with a "Priority" parameter whose value is lower than any of the (one or more) possible or allowed values that are allowed/supported by other network cells. In other words, by declaring purposely that a network cell $105_{ci}$ is associated with a "Priority" parameter whose value is lower than any of the (one or more) allowed values associated to other network cells, then that network cell $105_{ci}$ is thwarted to be considered by the user equipment 110 as a (valid) potential serving cell.

The four embodiments of above have been introduced by way of non-limitative examples only, and, according to specific design choices, they may be freely combined to each other, e.g. either partially (i.e., with one or more aspects of one or more of these embodiments that may be combined with one or more aspects of one or more of the other embodiments) or totally. Moreover, as mentioned above, one or more of these embodiments (or of one or more aspects thereof) may define additional functionalities to the embodiment, herein exemplary assumed, that provides for setting a network cell $105_{ci}$ in the barred or unbarred condition for making that network cell $105_{ci}$ unavailable or available for camping, respectively for example, one or more of these embodiments (or of one or more aspects thereof) may be invoked in case of cell barring or cell unbarring failures.

According to an embodiment of the present invention, action step 225 can include the removal of the affected cell $105_{ci}$ from the neighbor lists of the other network cells, in order to prevent any reselection or handover towards such affected cell $105_{ci}$.

According to an embodiment of the present invention, action step 240 can include the restoration of the previously removed affected cell $105_{ci}$ in the neighbor lists of the other network cells, in order to resume the possibility of reselection or handover towards such previously affected cell $105_{ci}$.

Back to the activity diagram, the method 200 is preferably carried out for each network cell $105_{ci}$ of the mobile cellular network 100. This is conceptually illustrated in the figure by loop connection between the action steps 225 and 240 and the loop control step L. However, as should be readily understood, in case the method 200 is intended to be implemented as a distributed cell availability functionality, and, in order to achieve that, it is run at a subset of network nodes $105_i$ each one associated with or pertaining to one or more respective network cells $105_{ci}$, the loop control step L of the method 200 runs at a certain network node $105_i$ is intended as a reiteration of the steps 210-240 for each associated network cell $105_{ci}$ (in the borderline case of each network node $105_i$ associated with only one network cell $105_{ci}$, the loop control step L may also be omitted).

According to a preferred, not limiting, embodiment of the present invention, a network cell $105_{ci}$ is set in the barred or unbarred condition based on a hysteresis between the threshold radio interference $I_{TH}$ and a further threshold radio interference $I_{TH,F}$, the further threshold radio interference $I_{TH,F}$ being preferably lower than the threshold radio interference $I_{TH}$.

Preferably, the network cell $105_{ci}$ is set in the barred condition if the radio interference affecting it is higher than the threshold radio interference $I_{TH}$ and in the unbarred condition if the radio interference affecting it is lower than the further threshold radio interference $I_{TH,F}$ (exit branch Y of the decision step 230). Even more preferably, if the radio interference affecting the network cell $105_{ci}$ is between the threshold radio interference $I_{TH}$ and the further threshold radio interference $I_{TH,F}$, the network cell $105_{ci}$ is preferably left in its current (barred or unbarred) condition. This is conceptually shown in the figure by loop connection between the exit branch N of the decision step 230 (meaning that the radio interference affecting the network cell $105_{ci}$ is neither higher than the threshold radio interference $I_{TH}$ nor lower than the further threshold radio interference $I_{TH,F}$) and the loop control step L, without interposition of any step.

As visible in the figure (see decision step 210), advantageously, said determining the radio interference affecting a network cell $105_{ci}$ (action step 215) and said setting the network cell $105_{ci}$ in the barred (or, more generally, first) or unbarred (or, more generally, second) condition (decision 220,230 and action 225,240 steps) are carried out further if the network cell $105_{ci}$ has been in the unbarred (or, more generally, second) or in the barred (or, more generally, first) condition, respectively, for a time interval longer than a threshold time interval. In other words, the threshold time interval identifies a minimum time interval that should elapse between a last switching of the network cell $105_{ci}$ (from the barred condition to the unbarred condition or from the unbarred condition to the barred condition). This allows avoiding, for example, excessive waste of power, high inefficiencies and burdensome computational efforts that relative frequent switching of the network cells $105_{ci}$ could determine.

Preferably, said checking if the network cell $105_{ci}$ has been in the current (barred or unbarred) condition for a time interval longer than the threshold time interval is achieved by comparing a time variable $LC_i$ associated with the network cell $105_{ci}$ (and indicative of the time interval elapsed since the last switching of the network cell $105_{ci}$ or, equivalently, of a time interval since the network cell $105_{ci}$ is in the current condition) with said threshold time interval (said comparison being preferably carried out at the comparator module 310 of the central system 115). If, as a result of such a comparison, the time variable $LC_i$ is lower than the threshold time interval (exit branch N of the decision step 210), indicating that the minimum time interval from the last switching of the network cell $105_{ci}$ has already elapsed, the following steps 215-240 are carried out as discussed, otherwise (exit branch Y of the decision step 210), indicating that the minimum time interval from the last switching of the network cell $105_{ci}$ has not elapsed yet, the following network cell $105_{ci}$ is considered (as conceptually represented in the figure by loop connection between the exit branch Y of the decision step 210 and the loop control step L).

Preferably, as illustrated in the figure, when the network cell $105_{ci}$ considered in a current iteration of the method 200 is set (i.e., switched) in the first (e.g., barred) condition (action step 225) or in the second (e.g., unbarred) condition (action step 240), the respective time variable $LC_i$ is set/updated at a value indicative of the time at which such a switching has taken place (denoted in the respective action steps as "current time"), so as to be considered it in the following iterations of the method 200. Advantageously, at the first running of the method 200, and whenever necessary for management purposes of the mobile cellular network 100, the set of time variables $LC_i$ (or a subset thereof) are preliminarily initialized at a proper initialization value (e.g., 0)—action step 205—thereafter they are updated as discussed above at each iteration of the method 200 (i.e., of the steps 210-240).

According to an embodiment of the present invention, the radio interference affecting the network cell $105_{ci}$ is determined and provided by a performance management module 320 of an "Operational Support System" (hereinafter, OSS system) of the mobile cellular network 100. For the purposes of the present invention, the performance management module 320 is arranged for combining or aggregating performance measurements (including, for example, frequency of call attempts, blocked or abandoned calls, failed handover processes, packet loss in IP networks) from one or more network nodes $105_i$ (as conceptually illustrated by arrow connection between the network nodes and the performance management module 320).

Preferably, as illustrated, the OSS system also comprises a configuration management module 325 arranged for "reading" (i.e., determining or detecting) and "writing" (i.e., configuring or setting) the mobile cellular network 100 parameters. For the purposes of the present invention, the configuration management module 325 is arranged for "reading" and "writing" the first (e.g., barred) or second (e.g., unbarred) condition of one or more network nodes $105_i$. In order to achieve that, the configuration management module 325 is communicably coupled to the instructor module 315 for receiving from it the instruction of setting (switching) the network cell $105_{ci}$ to a different, first or second, condition, and to comply with the received instruction.

As schematically illustrated in FIG. 3 by arrow connections, the determiner module 305 is communicably coupled to the performance management module 320 (so as to receive from it the performance measurements required to determine the radio interference of the network cell $105_{ci}$) and the comparator module 310 is communicably coupled to the configuration management module 325 (so as to receive from it an indication of the current time at which the switching of the network cell $105_{ci}$ to the different, first or second, condition has taken place and update the respective time variable $LC_i$ accordingly).

For the sake of completeness, the OSS system may further comprise a trace management module for tracking messages between the mobile cellular network 100 and the user equipment, and a fault management module for determining malfunctioning of the mobile cellular network 100—the trace and fault management modules being not illustrated as not relevant for the preferred embodiment of present invention.

Preferably, although not necessarily, the radio interference affecting the network cell $105_{ci}$ is based on one or more performance indicators (typically denoted as "Key Performance Indicators"—KPIs—in SON networks). In the preferred embodiment of the present invention, the radio interference affecting the network cell $105_{ci}$ is based on (i.e., the KPIs comprise) at least one among a (uplink and/or downlink) throughput of those user equipment 110 currently camped on that network cell $105_{ci}$, and a "Received Total Wideband Power" (see 3GPP TS 25.215 specifications).

According to an embodiment of the present invention, the radio interference affecting the network cell $105_{ci}$ is based on (i.e., the KPIs comprise) at least one among an average (uplink and/or downlink) throughput of those user equipment 110 currently camped on that network cell, and an average "Received Total Wideband Power". Said average throughput and said average "Received Total Wideband Power" are averaged, preferably, on respective predetermined monitoring time intervals (for example, of the order of minutes, hours, days, or weeks), more preferably on a same monitoring time interval.

According to another embodiment of the present invention, the radio interference affecting the network cell $105_{ci}$ is based on (i.e., the KPIs comprise) at least one among a cumulative distribution of the (uplink and/or downlink) throughput of those user equipment 110 currently camped on that network cell, and a cumulative distribution of the "Received Total Wideband Power"—in which case the threshold radio interference $I_{TH}$ and, when provided, the further threshold radio interference $I_{TH,F}$ being preferably defined as respective percentiles of the cumulative distributions.

The skilled persons can easily recognize that several other possible KPIs can be considered in order to assess the radio interference situation of a network cell $105_{ci}$.

Advantageously, although not necessarily, the network cell $105_{ci}$ is set the unbarred condition also based on a current data traffic load of the network cell $105_{ci}$. Preferably, the current data traffic load is determined based on a transmission power of the network cell $105_{ci}$ and/or a percentage of occupied "Orthogonal Variable Spreading Factor" codes. More preferably, the transmission power of the network cell $105_{ci}$ and/or a percentage of occupied "Orthogonal Variable Spreading Factor" codes are received at the performance management module 320 together with the other performance measurements, and, even more preferably, the current data traffic load is calculated therefrom at the determiner module 305.

Back to FIG. 2, the network cell $105_{ci}$ is set in the unbarred condition if the current data traffic load of the network cell $105_{ci}$ is lower than a threshold data traffic load indicative of a maximum data traffic load that can be sustained by that network cell $105_{ci}$ (this comparison being preferably performed at the comparator module 310), as conceptually shown in the figure by provision of a decision step 235 between the decision 230 and action 240 steps.

Preferably, as illustrated, if the radio interference affecting the network cell $105_{ci}$ is lower than the threshold radio interference $I_{TH}$ (exit branch Y of the decision step 230), and if the current data traffic load of the network cell $105_{ci}$ is lower than said threshold data traffic load (exit branch Y of the decision step 235) the network cell $105_{ci}$ is set/switched in the second (e.g., unbarred) condition, otherwise (exit branch N of the decision step 235) the network cell $105_{ci}$ is preferably left in its current (barred or unbarred) condition (see loop connection between the exit branch N of the decision step 225 and the loop control step L, without interposition of any step).

In the former discussion, no reference to a specific (uplink and/or downlink) radio interference has been made. Indeed, the principles of the present invention apply regardless of which (uplink and/or downlink) communication channel is considered.

Moreover, as should be readily understood, depending on which (uplink and/or downlink) radio interference is considered, further steps could be envisaged in the method 200 (not shown). By way of example only, if the radio interference affecting the network cell $105_{ci}$ is higher than the threshold radio interference $I_{TH}$ and if the radio interference affects the network cell $105_{ci}$ in uplink transmission, the method 200 may also comprise making radio resources of that network cell $105_{ci}$ available to downlink carrier aggregation with other network cells even if the affected cell $105_{ci}$ is made unavailable for camping, or if the radio interference affecting the network cell $105_{ci}$ is higher than the threshold radio interference $I_{TH}$ and if the radio interference affects the network cell $105_{ci}$ in downlink transmission, the method 200 may instead comprise making radio resources of that network cell $105_{ci}$ available to uplink carrier aggregation with other network cells even if the affected cell $105_{ci}$ is made unavailable for camping.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A method for operating a mobile cellular network, comprising, for at least one cell of a plurality of cells of the mobile cellular network:
   determining a radio interference affecting the at least one cell in at least one between uplink and downlink transmissions; and
   if the radio interference affecting the at least one cell is higher than a first threshold radio interference, setting the at least one cell in a first condition for preventing any user equipment using the mobile cellular network from camping on the at least one cell for the least one between uplink and downlink transmissions; or
   if the radio interference affecting the at least one cell is lower than the first threshold radio interference, setting the at least one cell in a second condition for allowing any user equipment using the mobile cellular network to camp on the at least one cell for the at least one between uplink and downlink transmissions.

2. The method according to claim 1, wherein the setting the at least one cell in a second condition comprises setting the at least one cell in the second condition if the radio interference affecting the at least one cell is lower than a second threshold radio interference level lower than the first threshold radio interference.

3. The method according to claim 2, further comprising, if the radio interference affecting the at least one cell is between the first threshold radio interference and the second threshold radio interference and the at least one cell is in the first condition, the at least one cell is left in the first or condition.

4. The method according to claim 1, wherein the determining a radio interference affecting the at least one cell and the setting the at least one cell in a first or second condition are carried out if the at least one cell has been in the second or first condition, respectively, longer than a threshold time interval.

5. The method according to claim 1, wherein the determining a radio interference affecting the at least one cell is based on at least one of:
throughput of user equipment currently camped on the at least one cell; or
Received Total Wideband Power.

6. The method according to claim 1, wherein the determining a radio interference affecting the at least one cell is based on at least one of:
average throughput of user equipment currently camped on the at least one cell, averaged on a first predetermined monitoring time interval; or
average Received Total Wideband Power, averaged on a second predetermined monitoring time interval.

7. The method according to claim 1, further comprising:
determining a current data traffic load of the at least one cell; and
wherein the setting the at least one cell in a second condition is carried out further if the current data traffic load of the at least one cell is lower than a threshold data traffic load indicative of a maximum data traffic load that can be sustained by the at least one cell.

8. The method according to claim 7, wherein the determining a current data traffic load of the at least one cell is based on at least one of:
transmission power of the at least one cell; or
percentage of occupied Orthogonal Variable Spreading Factor codes.

9. The method according to claim 1, wherein the setting the at least one cell in a first condition comprises setting the at least one cell in a barred condition and the setting the at least one cell in a second condition comprises setting the at least one cell in an unbarred condition.

10. The method according to claim 1, wherein the setting the at least one cell in a first condition comprises setting at least one cell selection parameter and/or at least one cell reselection parameter of the at least one cell at such a value that, respectively, a cell selection criterion and/or a cell reselection criterion is not fulfilled thereby preventing any user equipment from camping on the at least one cell.

11. The method according to claim 1, wherein the user equipment is allowed to camp only on cells associated with one or more first Public Land Mobile Networks, and wherein the setting the at least one cell in a first condition comprises signaling that the at least one cell is associated with a second Public Land Mobile Network different from any of the one or more first Public Land Mobile Networks.

12. The method according to claim 1, wherein the at least one cell is compliant with the Application specific Congestion control for Data Communication functionality, and wherein the setting the at least one cell in a first condition comprises signaling to the user equipment that an access to the at least one cell is barred for at least one Access Class.

13. The method according to claim 1, wherein the user equipment is allowed to camp only on cells associated with one or more allowed values of a Priority parameter, and wherein the setting the at least one cell in a first condition comprises signaling to the user equipment that the cell is associated with a Priority parameter whose value is lower than any of the allowed values.

14. A non-transitory computer readable medium including a computer program product directly loadable into a memory of a computer, the computer program product comprising software code to cause the computer to perform a method for operating a mobile cellular network, comprising, for at least one cell of a plurality of cells of the mobile cellular network:
determining a radio interference affecting the at least one cell in at least one between uplink and downlink transmissions; and
if the radio interference affecting the at least one cell is higher than a first threshold radio interference, setting the at least one cell in a first condition for preventing any user equipment using the mobile cellular network from camping on the at least one cell for the least one between uplink and downlink transmissions; or
if the radio interference affecting the at least one cell is lower than the first threshold radio interference, setting the at least one cell in a second condition for allowing any user equipment using the mobile cellular network to camp on the at least one cell for the at least one between uplink and downlink transmissions.

15. A system for operating a mobile cellular network, the system comprising:
circuitry configured to
determine a radio interference affecting at least one cell of a plurality of cells of the mobile cellular network in at least one between uplink and downlink transmissions;
compare the determined radio interference a with a threshold radio interference; and
cause the at least one cell to be set in:
a first condition preventing any user equipment using the mobile cellular network from camping on the at least one cell for the at least one between uplink and downlink transmissions, if the radio interference affecting the at least one cell is higher than the threshold radio interference, or
a second condition allowing any user equipment using the mobile cellular network to camp on the at least one cell for the at least one between uplink and downlink transmissions, if the radio interference affecting the at least one cell is lower than the threshold radio interference.

\* \* \* \* \*